United States Patent
Theimer

(10) Patent No.: US 9,772,739 B2
(45) Date of Patent: Sep. 26, 2017

(54) METHOD FOR CONTROLLING A SYSTEM, ESPECIALLY AN ELECTRICAL AND/OR ELECTRONIC SYSTEM COMPRISING AT LEAST ONE APPLICATION DEVICE

(75) Inventor: Wolfgang Theimer, Bochum (DE)

(73) Assignee: Nokia Technologies Oy, Espoo (FI)

( * ) Notice: Subject to any disclaimer, the term of this patent is extended or adjusted under 35 U.S.C. 154(b) by 1226 days.

(21) Appl. No.: 09/847,145

(22) Filed: May 2, 2001

(65) Prior Publication Data

US 2001/0056307 A1    Dec. 27, 2001

(30) Foreign Application Priority Data

May 3, 2000    (DE) .................................... 10021389

(51) Int. Cl.
*G06F 3/0481*    (2013.01)
*G06F 3/0484*    (2013.01)
*G06F 3/14*    (2006.01)

(52) U.S. Cl.
CPC ........ *G06F 3/0481* (2013.01); *G06F 3/04847* (2013.01); *G06F 3/14* (2013.01); *H04M 2250/56* (2013.01)

(58) Field of Classification Search
CPC ......... G06F 2300/1081; G06F 2300/63; G06F 3/167; G06F 3/0481; G10L 2013/00
USPC ...... 345/169; 725/37–61; 715/169, 716–722, 715/727–729, 738, 740
See application file for complete search history.

(56) References Cited

U.S. PATENT DOCUMENTS

| | | | |
|---|---|---|---|
| 4,569,026 A * | 2/1986 | Best | 715/716 |
| 4,827,520 A | 5/1989 | Zeinstra | |
| 5,086,385 A | 2/1992 | Launey et al. | |
| 5,410,326 A * | 4/1995 | Goldstein | 348/734 |
| 5,769,527 A * | 6/1998 | Taylor et al. | 362/85 |
| 5,774,859 A * | 6/1998 | Houser et al. | 704/275 |
| 5,890,122 A | 3/1999 | Van Kleeck et al. | |
| 6,006,183 A | 12/1999 | Lai et al. | |
| 6,130,726 A * | 10/2000 | Darbee et al. | 348/734 |
| 6,202,008 B1 | 3/2001 | Beckert et al. | |
| 6,397,186 B1 * | 5/2002 | Bush et al. | 704/274 |
| 6,407,779 B1 * | 6/2002 | Herz | 348/734 |
| 6,424,357 B1 | 7/2002 | Frulla et al. | |

(Continued)

FOREIGN PATENT DOCUMENTS

| | | |
|---|---|---|
| DE | 4124024 A1 | 3/1992 |
| DE | 42 14 668 A1 | 11/1993 |

(Continued)

OTHER PUBLICATIONS

Office Action from Japanese Patent Application No. 2001-135939, mailed Jan. 25, 2011.

(Continued)

*Primary Examiner* — Doon Chow
*Assistant Examiner* — Le Nguyen
(74) *Attorney, Agent, or Firm* — Alston & Bird LLP

(57) ABSTRACT

The invention relates to a method for controlling a system, especially an electrical and/or electronic system comprising at least one application device. To simplify and to facilitate the use of the system it is provided that control information input is interpreted in accordance with available application devices and an application device is controlled in accordance with the result of the interpretation.

13 Claims, 2 Drawing Sheets

(56) References Cited

U.S. PATENT DOCUMENTS

| | | | |
|---|---|---|---|
| 6,445,398 B1* | 9/2002 | Gerba et al. | 345/721 |
| 6,522,342 B1* | 2/2003 | Gagnon et al. | 715/716 |
| 6,535,854 B2* | 3/2003 | Buchner et al. | 704/275 |
| 6,553,345 B1* | 4/2003 | Kuhn et al. | 704/275 |
| 6,584,439 B1* | 6/2003 | Geilhufe et al. | 704/270 |
| 6,629,077 B1 | 9/2003 | Arling et al. | |
| 6,690,391 B1* | 2/2004 | Kim et al. | 345/720 |
| 6,718,307 B1* | 4/2004 | Buil et al. | 704/270 |
| 6,757,656 B1 | 6/2004 | Gong et al. | |
| 6,839,670 B1* | 1/2005 | Stammler et al. | 704/251 |
| 6,882,299 B1* | 4/2005 | Allport | 341/176 |
| 6,931,104 B1* | 8/2005 | Foster et al. | 379/88.02 |
| 2002/0069063 A1 | 6/2002 | Buchner et al. | |
| 2003/0182132 A1 | 9/2003 | Niemoeller | |
| 2008/0059188 A1* | 3/2008 | Konopka et al. | 704/257 |

FOREIGN PATENT DOCUMENTS

| | | | |
|---|---|---|---|
| DE | 4407319 A1 | 9/1994 | |
| DE | 195 33 541 | 3/1997 | |
| DE | 197 09 518 C1 | 3/1998 | |
| DE | 19821235 A1 | 11/1999 | |
| EP | 0406486 | 1/1991 | |
| EP | 0746129 A | 12/1996 | |
| EP | 0788268 A | 8/1997 | |
| EP | 0837388 | 4/1998 | |
| EP | 0877518 A | 11/1998 | |
| EP | 0 986 809 B1 | 3/2000 | |
| EP | 1 054 390 A2 | 11/2000 | |
| EP | 1 063 636 A2 | 12/2000 | |
| EP | 1 184 841 A1 | 3/2002 | |
| GB | 2275800 A * | 9/1994 | G08C 23/00 |
| JP | 60-158495 A | 8/1985 | |
| JP | H03-221999 A | 9/1991 | |
| JP | 5-268335 A | 10/1993 | |
| JP | 6-004264 A | 1/1994 | |
| JP | 11-231891 A | 8/1999 | |
| JP | 11-311996 A | 11/1999 | |
| JP | 2000-029585 A | 1/2000 | |
| JP | 2000-099076 A | 4/2000 | |
| WO | WO 97/32439 | 9/1997 | |
| WO | 9931856 A | 6/1999 | |
| WO | WO 99/50831 | 10/1999 | |
| WO | 9959311 A | 11/1999 | |

OTHER PUBLICATIONS

Office Action for Japanese Application No. 2001-135939 dated Nov. 27, 2012.
Extended European Search Report for corresponding European Application No. 16156665.8 dated Aug. 22, 2016.
Office Action for European Application No. 01 109 965.2 dated May 25, 2010, (no translation available).
Office Action for Japanese Application No. 2011-107926 dated Oct. 15, 2012.
Office Action for Japanese Application No. 2011/107926 dated Oct. 24, 2013.
Evans, J.R. et al., *Achieving a Hands-Free Computer Interface Using Voice Recognition and Speech Synthesis [for ATE]*, AUTOTESTCON '99, IEEE Systems Readiness Technology Conference (1999) pp. 105-107.
European Search Report dated Nov. 26, 2009.
Office Action for European Patent Application No. 16 156 665.8 dated Jun. 22, 2017, 7 pages.

* cited by examiner

METHOD FOR CONTROLLING A SYSTEM, ESPECIALLY AN ELECTRICAL AND/OR ELECTRONIC SYSTEM COMPRISING AT LEAST ONE APPLICATION DEVICE

BACKGROUND OF THE INVENTION

The invention relates to a method for controlling a system, especially an electrical and/or electronic system comprising at least one application device.

For controlling electrical and/or electronic systems such as, for example, mobile telephones, navigation systems, traffic information systems, it is usually required that a user must work through a more or less elaborate menu structure in order to input a particular control instruction or to perform a particular adjustment.

If, for example, a user wants to set the clock time in a mobile telephone, he must first select the instruction "Clock" from a menu "Adjustments". The instructions offered in this menu item are then indicated from which he then selects the instruction "Set clock" in order to be able to set the clock time. It is similarly complex if it is intended to set the volume or the type of a ringing tone.

If a number of applications are connected to an input device, that is to say, if, for example, an input device is simultaneously used for operating a navigation system, a broadcast receiver and a mobile telephone, the menu structure becomes even more complex and the operation of the individual applications becomes more cumbersome.

SUMMARY OF THE INVENTION

The invention uses this as a basis for the object of providing a method for controlling a system which simplifies and facilitates the use of the system for the user.

This object is achieved by the method according to claim 1. Advantageous further developments and embodiments of the invention are described in the subclaims.

According to the invention, therefore, it is provided that a control information item input by a user is interpreted in accordance with the available application devices and that an application device is then controlled in accordance with the result of the interpretation.

According to the invention, therefore, the user issues as control information a control instruction, e.g. "Set clock", a control instruction together with control or destination parameters, e.g. "Navigation; Bochum; Meesmannstr.; 103" or control or destination parameters, e.g. "Louder", "WDR2" or "Müller". If the control information item input is complete as in the case of "WDR2" or "Navigation; Bochum; Meesmannstr.; 103", the corresponding application device, i.e. the radio set or the navigation system is appropriately controlled. If the control information is unambiguous but incomplete as in "Set clock", the user is requested to input the required adjustment parameters. If the control information item is ambiguous such as in the case "Louder" or "Müller" because the control information item input can be sensibly processed by a number of applications, then the user is requested to supply a corresponding addition and is told, if necessary, of the available options for interpretation of the input.

According to the invention, therefore, the method for controlling a system is detached from a permanently predetermined menu structure and takes into consideration human thinking structures in which the first thing is always the wish—e.g. "I would like to hear the music more loudly" and only then following on from here the path to this target—setting the volume control on the broadcast receiver to "Louder"—is thought of. The method according to the invention thus enables the user to input his adjustment or control wish into the system which thereupon automatically finds the way for implementing this adjustment or control wish and executes it.

To prevent wrong identification of the user input, it is provided in an advantageous embodiment of the invention that the control information input by a user is signalled back to the user as announcement or indication for acknowledgement, control information item input which allows a number of possibilities of its information being displayed as selection list.

The return signalling of the user input, provided in accordance with the invention, ensures, on the one hand, that the input information item has been correctly recognized and, on the other hand, it is also possible to interrogate at the same time together with the return signalling of the ambiguous adjustment instruction "Louder" which function is to be set "louder" in that, in addition to this instruction, the possible functions to be set louder are also specified, that is to say, e.g. "Ringing tone louder", "Traffic information messages louder", "Broadcast reproduction louder", "Warning tones louder" and the like.

It is particularly expedient if input control information which cannot be reliably interpreted is appropriately marked in the return signalling.

Another further development of the invention is characterized in that a check is made whether the control information is complete in order to be able to perform a requested action and that the user is requested to complete the control information if this is not so.

In an advantageous embodiment of the invention, it is provided that the control information input as keyword or keywords is compared with stored key words for interpretation purposes, the available application devices, control instructions and control parameters being stored as control information. The control parameters are suitably stored as lists in this case.

Thus, the method according to the invention is based on a control information database in which the individual possible functions of the system which are determined by the individual application devices are in each case stored as complete data records. For example, the data record with the control information "WDR2" also comprises the application "Broadcast receiver" and the note "Set station".

It is particularly expedient if control instructions are stored as data records together with dummy codes for the application devices affected and the control parameters in each case needed for executing the instruction.

BRIEF DESCRIPTION OF THE DRAWING

In the text which follows, the invention is explained by way of example and referring to the drawing, in which.

DETAILED DESCRIPTION OF THE INVENTION

Figure 1:
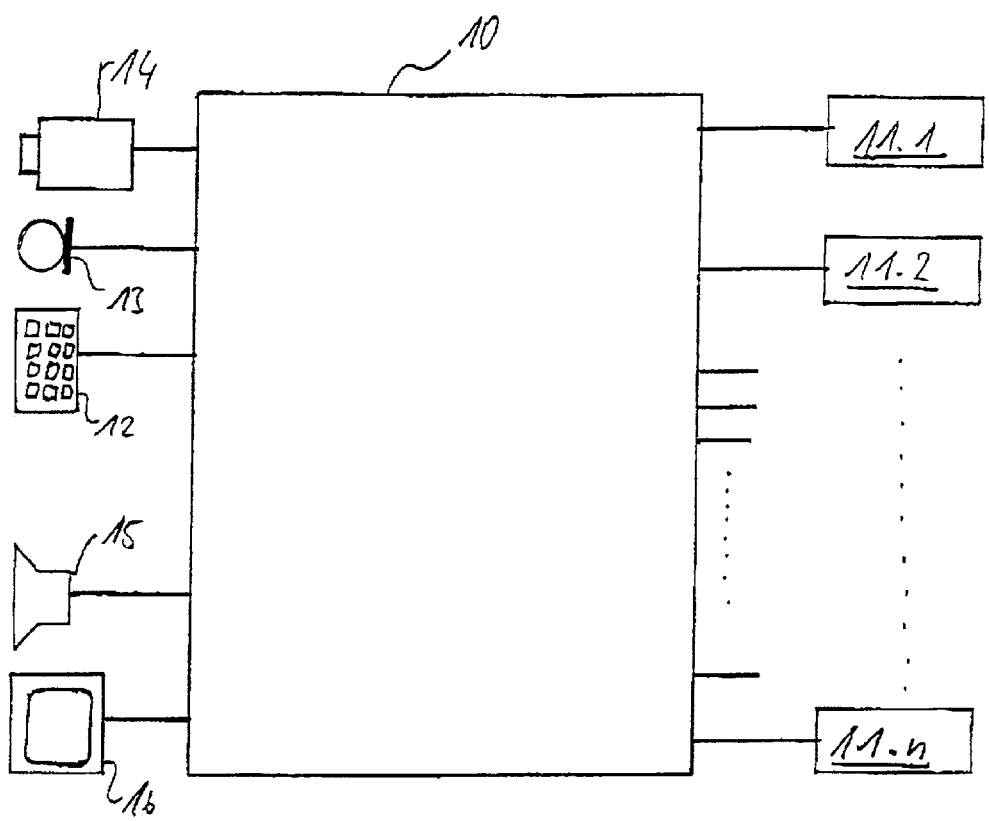
FIG. 1 shows a diagrammatic block diagram of an electronic system comprising a plurality of application devices, which can be controlled by means of the method according to the invention.

In the various figures of the drawing, elements corresponding to one another are provided with the same reference symbols.

As is shown purely diagrammatically in FIG. 1, an electrical and/or electronic system comprises a user interface 10 to which one or more application devices 11.1, 11.2, ... 11.n are connected. In this arrangement, a navigation system, a mobile telephone, a traffic information unit, a broadcast receiver, a CD player, a cassette recorder and the like can be provided as application devices 11.i.

To be able to input control information for the individual application devices 11.i, a keyboard 12, a microphone 13 and/or a video camera 14 are connected, for example, to the user interface 10 so that information can be input as character sequence via the keyboard 12, as spoken instructions via the microphone 13 or as gestures via the video camera 14. The keyboard can also be provided, in addition to individual keys, with single or multiple character allocation, with rotary pushbuttons for selecting and inputting characters and/or terms from lists or so-called soft keys, that is to say adjusting elements which can be assigned different input functions depending on the application.

To be able to output information to the user, a loudspeaker 15 and/or a screen 16, for example, are connected to the user interface 10. This screen 16 can be at least partially, a touch screen which comprises a number of buttons 17, 18, 19, 20 which, when touched, handle the operation of conventional keys and different functions can be allocated to the buttons 17, 18, 19, 20 depending on the application activated.

Figure 2:
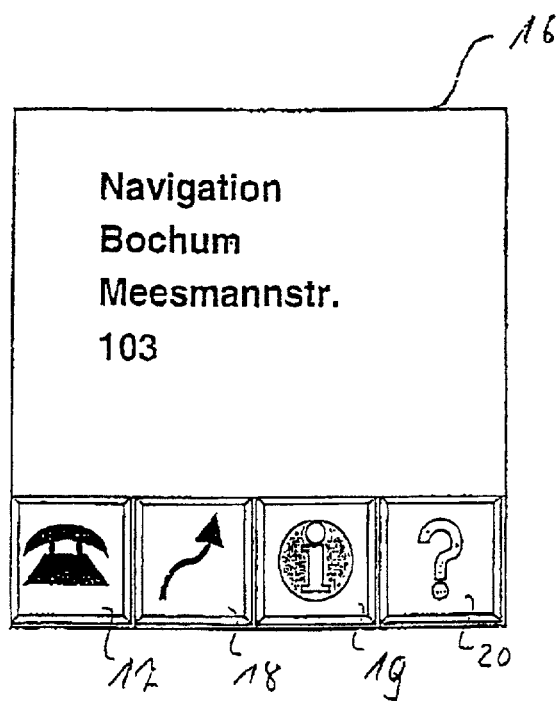
FIG. 2 shows an example of a visual return signalling on a screen.

In the case of the screen 16 shown in FIG. 2, the buttons 17, 18, 19 and 20 are used for activating a mobile telephone, a navigation system, a traffic information unit and an auxiliary function, respectively.

Figure 3:
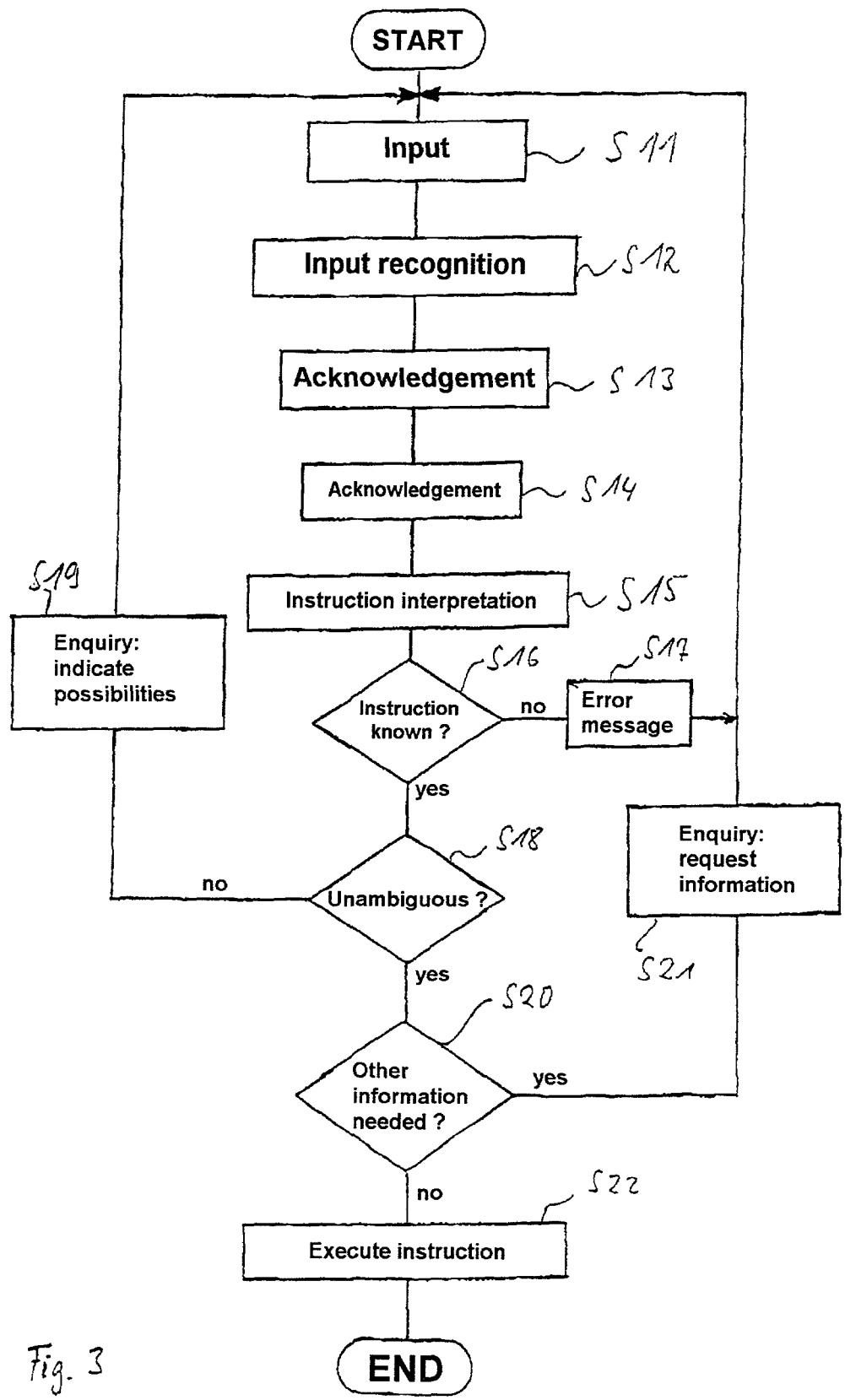
FIG. 3 shows a simplified diagrammatic block diagram for illustrating the method according to the invention.

As shown in FIG. 3, the user first inputs a control information for controlling the activated system in step S11, which information consists of an individual control instruction or control parameter, of a target input or a combination thereof. Control information is expediently input in the form of keywords which are stored, together with the associated activities, in a corresponding database of the user interface.

After the control information has been input in step S11, an input identification is first performed in step S12 in order then, in step S13, to output an audible or visual return signal by means of which the user is, at the same time, requested to confirm his input in step S14. If the input has not been identified with complete reliability during the input identification in step S12, an information item on the reliability of the input identification and/or a list of keywords possibly identified can be output together with the return signal.

The reliability of the input identification can be indicated by colours, e.g. green, yellow, red for reliable, probable, unreliable or by a magic eye which illustrates the reliability of the input identification by the size of an area emphasized therein, or by a combination of these options. In the case of the magic eye, e.g. an uncertain input identification can be indicated by a red circular area, the colour of which changes via orange to yellow and on to green with increasing reliability of the identification, whilst the area as such changes from a circle via an ellipse or a circular segment to a line or a type of exclamation mark.

The user then has the possibility of discarding the input when confirming in step S14 or, if a list of keywords has been output, to select the desired input from this list and to confirm it.

If the input was confirmed in step S14, the instruction is interpreted in step S15 for which purpose the keyword or words input is/are compared with the keywords stored in the database of the user interface 10.

However, it is also possible, after the input identification in step S12, to go directly to the input interpretation in step S15 in order to perform the return signalling and confirmation later.

In step S16, it is first ascertained whether the keyword input or, respectively, the instruction input is known. If this is not the case, an error message will occur in step S17 and the method returns to step S11. If the instruction is known, a check is then made in step S18 whether the instruction is unambiguous, that is to say it is ascertained whether a known instruction can only be executed in one or also in a number of applications and whether it is also associated with a number of functions in an application. If this is the case, that is to say, if the instruction is ambiguous, an enquiry is output to the user in step S19 in which, at the same time, the possible functions are indicated to which this instruction can be applied.

An indication hierarchy may need to be taken into consideration, in order to assist the user during the input and not to confuse him. If a control instruction can be applied to a number of applications and to a number of functions within one or more applications, it is appropriate to allow first the application and then the desired function to be controlled in a further selection step to be selected.

If the instruction input or the control information item input is unambiguous, a check is made in step S20 whether further information is required in order to execute the instruction. If this is the case, a corresponding enquiry is output to the user in step S21 in order to request the additional information needed. If no further information is needed, the instruction is executed in step S22.

If, as indicated above, the instruction interpretation is performed in step S15 immediately after the input identification in step S12 in order to check then whether the instruction is known (step S16), unambiguous (step S18) and complete (step S20), this can be followed by a return signal according to step S13 in order to request an acknowledgement of the input and/or the input of other possibilities or information.

The method according to the invention for controlling a system will now be explained in greater detail with reference to specific examples.

If the system comprises a broadcast receiver as application devices 11.i and if a user wishes to listen to a particular station, e.g. "WDR2", he can input, for example, "WDR2" as control information. When the user then has confirmed the correct input identification in step S14 following the return signal in step S13, the instructions "Switch on broadcast receiver" and "Set station WDR2" are determined for the keyword "WDR2" in the instruction or keyword database. Since the keyword "WDR2" input as control information can be allocated to only one application device, namely the broadcast receiver and can be allocated to only one function, namely the station selection, in this application device, and then only designates a single station, the control information is unambiguous and complete so that the corresponding instruction or instructions can be executed without further enquiries in step S22.

If the system also comprises, in addition to a navigation system which is associated with an address book, a mobile telephone with a corresponding telephone book, then a name stored in the address and/or telephone book can also be input, for example, as control information. If, for example, the name "Müller" is thus, input as control information, the system then identifies in step S12, for example, not only the name "Müller" but also the names "Möller" and "Mehler"

which are then indicated on the screen in step S13. The user can then select and acknowledge the required name from those indicated in step S14.

During the instruction interpretation in step S15, it is found, for example, that both an address in the address book and a telephone number in the telephone book are allocated to the name "Müller", the system thus recognizes that either a telephone connection must be set up from the mobile telephone to "Müller" or that a route guidance to the residence or to the office of "Müller" must be performed by the navigation system. Thus, the control instructions which can be derived from the control information are not unambiguous so that, in step S19, an interrogation is made as to which application is to be started. If a number of telephone numbers is stored in the telephone book, or a number of addresses in the address book, under "Müller", the control input is still not complete even after selection of the mobile telephone or of the navigation system so that a further enquiry is required.

As soon as the instruction information is unambiguous, if, for example, it is clear that route guidance to the office of "Müller" is desired, the navigation is started in step S22 and the office address of "Müller" from the address book is used as target address.

A further input possibility is, for example, for "Navigation", "Bochum", Meesmannstr." and "103" to be input as keywords, such that both the desired application and the control parameters needed by the application are input as keywords in a predetermined sequence. For this purpose, the keyword "Navigation" is stored in the database in such a manner that it is associated with dummy codes for the address, namely <Town>, <Street>, <House number>. To be able to dispense with an input of control information which is structured in this manner, the possibility can also be provided that the keywords representing the address are in each case preceded by the corresponding dummy codes so that the address can be input in any order. In this case, the control information can be input, for example, in the following form:

"Navigation" "Street" "Meesmannstr." "Town" "Bochum".

Thus, as soon as a keyword input is preceded or followed by a keyword explaining its meaning, especially in the case of the navigation system, a rigid input structure can be omitted which is appropriate if the individual keywords are not explained.

A further possibility for controlling the system consists, for example, in that, in an active application, i.e., for example, when the broadcast receiver is switched on, the reproduction volume is increased following the input of the keyword "Louder". In this case, it is assumed, for the sake of simplicity, that only the active application can be meant if no further additional information is input, even though the keyword "Louder" does not specify an unambiguous instruction.

If, however, for example, two applications are active simultaneously, for example the broadcast receiver and the navigation system which, in addition to visual route guidance information on the screen 16, also announces direction of travel notes, the instruction to increase reproduction or announcement volume, derived from the keyword "Louder", is no longer unambiguous so that the program jumps to step S19 in step S18 in order to request the user to input further information so that it becomes clear whether he wants to hear louder radio or whether he wishes that the announcement volume of the route guidance notes are louder so that he can clearly recognize these in spite of listening to the radio.

The method according to the invention for controlling a system thus enables a user directly to control and adjust the various application devices of the system without having to work through a lengthy hierarchical menu since, on the basis of the control information input, the associated application and function are fetched out of a control instruction database by the system itself.

What is claimed is:

1. A method comprising:
   receiving control information in the form of a spoken command, wherein the control information comprises one or more keywords;
   determining, with a processor, whether the control information is ambiguous or unambiguous by comparing the one or more keywords with a database of stored keywords comprising an association of data records together with a plurality of dummy codes representing respective application devices, control parameters needed to execute the control information, and functions corresponding to the stored keywords, wherein the control information is determined to be ambiguous in an instance in which the control information is applicable to more than one possible target functions associated with a target application device;
   in an instance in which control information is unambiguous, automatically identifying a target application device or the plurality of application devices associated with the control information;
   in an instance in which control information is determined by the processor to be ambiguous: a) causing output of at least two selections of the possible target functions associated with the target application device, and b) receiving an indication of a selection such that the control information becomes unambiguous; and
   executing a command associated with the control information on the target application device.

2. The method according to claim 1, further comprising signaling for clarity when a control information input cannot be reliably interpreted.

3. The method according to claim 1, further comprising:
   determining whether the control information is complete or incomplete; and
   requesting completion of the control information following identification of incomplete or unknown control information.

4. The method according to claim 1, further comprising that the control parameters are stored as lists.

5. The method according to claim 1, further comprising providing a prompt for further information if the control information is unknown or is ambiguous or is incomplete.

6. An apparatus comprising at least one processor and at least one memory including computer program code, the at least one memory and the computer program code configured to, with the processor, cause the apparatus to at least:
   receive control information in the form of spoken command, wherein the control information comprises one or more keywords;
   determine whether the control information is ambiguous or unambiguous by comparing the one or more keywords with a database of stored keywords comprising an association of data records together with a plurality of dummy codes representing respective application devices, control parameters needed to execute the control instructions, and functions corresponding to the stored keywords, wherein the control information is determined to be ambiguous in an instance in which the control information is applicable to more than one possible target functions associated with a target application device;

in an instance in which control information is determined by the processor to be unambiguous, automatically identify a target application device or the plurality of application devices associated with the control information;

in an instance in which control information is ambiguous: a) cause output of at least two selections of possible target functions associated with the target application device, and b) receive an indication of selection such that the control information becomes unambiguous; and execute a command associated with the control information on the target application device.

7. An apparatus according to claim 6 wherein the at least one memory and the computer program code are further configured to, with the processor, cause the apparatus to:

request clarification of control information following identification of unknown or incomplete control information.

8. A computer program product comprising at least one non-transitory computer-readable storage medium having computer-executable program code instructions stored therein, the computer-executable program code instructions comprising program code instructions to:

receive control information in the form of a spoken command, wherein the control information comprises one or more keywords;

determine whether the control information is ambiguous or unambiguous by comparing the one or more keywords with a database of stored keywords comprising an association of data records together with a plurality of dummy codes representing respective application devices, control parameters needed to execute the control instructions, and functions corresponding to the stored keywords, wherein the control information is determined to be ambiguous in an instance in which the control information is applicable to more than one possible target functions associated with a target application device;

in an instance in which control information is unambiguous, automatically identify a target application device or the plurality of application devices associated with the control information;

in an instance in which control information is determined by the processor to be ambiguous: a) cause output of at least two selections of the possible target functions associated with the target application device, and b) receive an indication of a selection such that the control information becomes unambiguous; and execute a command associated with the control information on the target application device.

9. A computer program product according to claim 8, wherein the computer-executable program code instructions comprise program code instructions to send a signal as a confirmation of receiving control information.

10. A computer program product according to claim 9, wherein when the control information can be interpreted as one or more commands, the one or more commands are signaled back as a selection list.

11. A computer program product according to claim 9, wherein when the control information input cannot be reliably interpreted, a return signal is provided that marks the control information as unreliable.

12. A computer program product according to claim 8, wherein the computer-executable program code instructions comprise program code instructions to: determine whether the control information is complete or incomplete; and request completion of the control information following identification of incomplete control information.

13. A computer program product according to claim 8, wherein the computer-executable program code instructions comprise program code instructions to request further information following identification of unknown or incomplete control information.

* * * * *